(12) United States Patent
Beier et al.

(10) Patent No.: US 9,370,739 B2
(45) Date of Patent: Jun. 21, 2016

(54) JET ENGINE WITH AT LEAST ONE OIL SEPARATOR, THROUGH WHICH AN AIR-OIL-VOLUME FLOW CAN BE GUIDED

(71) Applicant: Rolls-Royce Deutschland Ltd & Co KG, Blankenfelde-Mahlow (DE)

(72) Inventors: Juergen Beier, Schulzendorf (DE); Gideon Venter, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 138 days.

(21) Appl. No.: 14/317,709

(22) Filed: Jun. 27, 2014

(65) Prior Publication Data

US 2015/0007531 A1   Jan. 8, 2015

(30) Foreign Application Priority Data

Jul. 1, 2013 (DE) .......................... 10 2013 106 877

(51) Int. Cl.
| | |
|---|---|
| B01D 45/16 | (2006.01) |
| F01D 25/18 | (2006.01) |
| F02C 7/06 | (2006.01) |
| F02C 7/32 | (2006.01) |

(52) U.S. Cl.
CPC ................ B01D 45/16 (2013.01); F01D 25/18 (2013.01); F02C 7/06 (2013.01); F02C 7/32 (2013.01); B01D 2257/702 (2013.01); B01D 2259/4575 (2013.01); F05D 2260/605 (2013.01); F05D 2260/609 (2013.01); F05D 2300/514 (2013.01)

(58) Field of Classification Search
CPC ........ B01D 45/12; B01D 45/14; B01D 45/16; B64C 1/1453; F01D 25/18; F02C 7/06
USPC ........... 55/306, 345, 404, 461; 96/306; 60/39, 60/8, 39.092; 415/110
See application file for complete search history.

(56) References Cited

U.S. PATENT DOCUMENTS

| | | | |
|---|---|---|---|
| 4,217,120 A | 8/1980 | Reynolds | |
| 4,525,995 A | 7/1985 | Clark | |
| 5,114,446 A * | 5/1992 | Giersdorf | ................ F01D 25/18 55/345 |
| 5,776,229 A | 7/1998 | Blanes et al. | |

(Continued)

FOREIGN PATENT DOCUMENTS

| | | |
|---|---|---|
| DE | 2845068 A1 | 4/1979 |
| DE | 69605014 T2 | 5/2000 |

(Continued)

OTHER PUBLICATIONS

German Search Report dated Mrach 5, 2014 from counterpart application No. 10 2013 106 877.4.

(Continued)

*Primary Examiner* — Duane Smith
*Assistant Examiner* — Minh-Chau Pham
(74) *Attorney, Agent, or Firm* — Timothy J. Klima; Shuttleworth & Ingersoll, PLC

(57) ABSTRACT

The present invention describes a jet engine with at least one oil separator, through which an air-oil volume flow can be guided out of at least one area supplied with oil for separating the oil. In accordance with the invention the air-oil volume flow from the area supplied with oil can be introduced into the oil separator via an interior of an accessory gearbox casing. The air can be discharged from the oil separator via an air outlet and the oil via an oil outlet.

10 Claims, 2 Drawing Sheets

(56) References Cited

U.S. PATENT DOCUMENTS

Figure 1A:
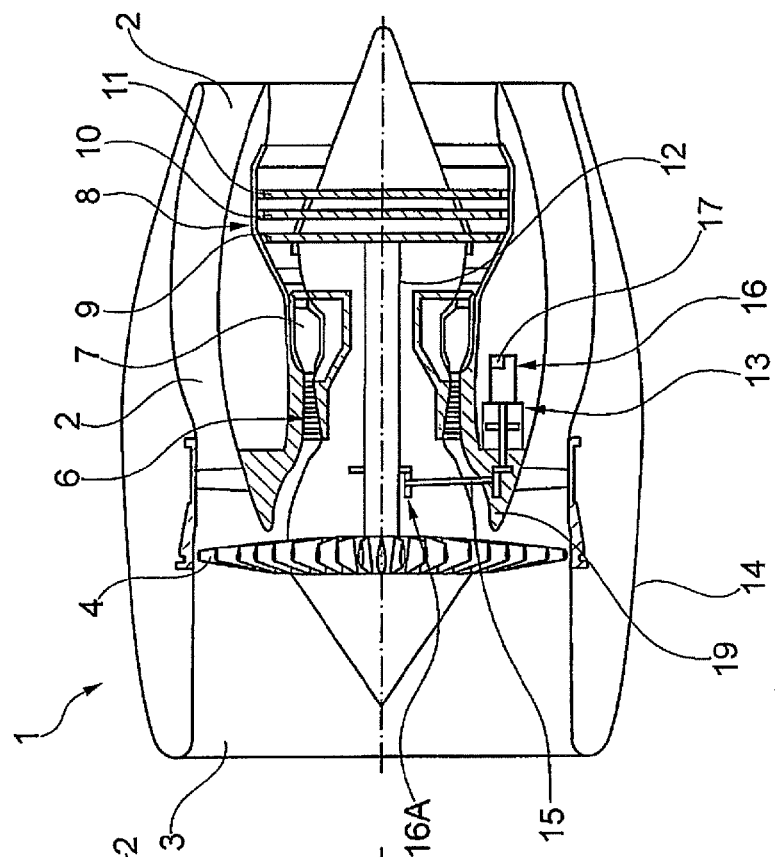

| | | |
|---|---|---|
| 6,893,478 B2 | 5/2005 | Care et al. |
| 2005/0211093 A1 | 9/2005 | Latulipe et al. |
| 2009/0133376 A1* | 5/2009 | Zysman .............. B64C 1/1453 60/39.08 |
| 2009/0133961 A1 | 5/2009 | Corattiyil et al. |
| 2009/0183950 A1 | 7/2009 | Brouillet et al. |
| 2011/0314830 A1 | 12/2011 | Legare |
| 2012/0060508 A1 | 3/2012 | Alecu et al. |
| 2012/0128466 A1 | 5/2012 | Raimarckers et al. |
| 2012/0144841 A1 | 6/2012 | Short et al. |
| 2015/0000246 A1* | 1/2015 | Beier .................... F01D 25/18 60/39.08 |
| 2015/0135660 A1* | 5/2015 | Beier .................... B01D 45/12 55/404 |
| 2015/0135663 A1* | 5/2015 | Beier .................... B01D 45/14 55/461 |
| 2015/0176447 A1* | 6/2015 | Beier .................... G02C 7/06 415/110 |
| 2015/0321130 A1* | 11/2015 | Beier .................... B01D 45/16 96/306 |

FOREIGN PATENT DOCUMENTS

| | | |
|---|---|---|
| DE | 60308574 | 1/2007 |
| DE | 60308574 A1 | 1/2007 |
| DE | 102006058343 A1 | 7/2008 |
| EP | 2592252 | 5/2013 |
| FR | 2961856 A1 | 12/2011 |

OTHER PUBLICATIONS

European Search Report dated Sep. 22, 2014 from counterpart App No. 14173863.7.
German Search Report dated Mar. 5, 2014 from related German application No. 10 2013 106 879.0.
European Search Report dated Oct. 8, 2014 from related European application No. 14175254.3.
Beier—U.S. Appl. No. 14/318,848, filed Jun. 30, 2014.
German Search Report dated Mar. 5, 2014 from counterpart application No. 10 2013 106 877.4.

* cited by examiner

JET ENGINE WITH AT LEAST ONE OIL SEPARATOR, THROUGH WHICH AN AIR-OIL-VOLUME FLOW CAN BE GUIDED

This application claims priority to German Patent Application DE102013106877.4 filed Jul. 1, 2013, the entirety of which is incorporated by reference herein.

This invention relates to a jet engine with at least one oil separator, through which an air-oil volume flow can be guided.

In jet engines known from practice, oil-containing consumed air from bearing chambers and from an oil tank is supplied during operation via separate lines to an oil separator or to a so-called breather, which can be designed as a centrifugal oil separator. The large oil particles from the consumed air or the air-oil volume flows from the bearing chambers and the oil tank are separated by a deflection area provided in the area of the breather and acting as a centrifuge. Oil particles with smaller diameters are collected by a metal foam arranged in the oil separator and are also filtered out of the air in this way. The oil separated by this method is returned to the oil circuit. The cleaned air is discharged offboard into the environment.

The air-oil volume flows supplied to the breather or centrifugal oil separator are heavily oiled and have a high temperature. As a result, there are also very fine oil particles in the air-oil volume flows. Due to their small size, these particles are only insufficiently separated by means of the centrifuge and only inadequately retained by the metal foam located in the centrifuge. As a result, they pass via an outlet of the oil separator for the airflow into the environment. These losses are the reason for the average oil consumption of modern engines. Moreover, the oil droplets non-separable in the area of the oil separator exit the engine in the form of a fine mist which causes high oil consumption in jet engines and is also unwelcome for environmental considerations.

A gas-turbine oil separator with a casing is known from DE 10 2006 058 343 A1, with the casing being provided with an inlet. A filter element that can be set to rotate is arranged in the casing and is provided with an air outlet downstream of the filter element. Additionally, the casing includes at least one oil outlet. Means for applying electrostatic forces are arranged upstream of the filter element in order to increase the tendency of oil drops to combine with an oil film in the filter element, and to improve a separation capacity in the area of the gas-turbine oil separator.

A temperature of an air-oil volume flow introduced into such gas-turbine oil separators, also referred to as breathers, may be disadvantageously very high, which is why electrostatic charging of an air-oil mixture known from the state of the art is only of limited suitability for improving a separation capacity in the area of a gas-turbine oil separator, since the oil present in gaseous form in the air-oil volume flow is not separable to the required extent out of the air-oil volume flow using the known procedure.

Furthermore, a gas-turbine machine is known from U.S. Pat. No. 4,525,995 in which several bearing devices of the machine are arranged in bearing chambers. Oil is extracted from the bearing chambers by air flowing through the bearing chambers, so that air-oil volume flows are guided out of the bearing chambers in the direction of an oil separator provided in the area of an accessory gearbox. In the area of the oil separator, the oil is separated out of the air-oil volume flows and the air is diverted in the direction of a low-pressure area of the machine, while the separated oil is guided in the direction of an inlet of an extraction pump. The air-oil volume flows each passing from the bearing chambers in the direction of the oil separator are introduced in areas separated from the interior of the accessory gearbox, past said interior, directly into the oil separator, possibly also at high temperature, for which reason the oil present in gaseous form in the air-oil volume flow supplied to the oil separator is also not separable to the required extent from the air-oil volume flow in the area of the oil separator.

The object underlying the present invention is therefore to provide a jet engine with at least one oil separator, in which by a simple and cost-effective design an oil content of an air volume flow discharged from the jet engine to the environment is as low as possible and in which cooling and lubrication of gear pairings arranged in the interior of the accessory gearbox casing is assured.

It is a particular object of the present invention to provide solution to the above problems by a jet engine having features described herein.

The jet engine in accordance with the invention is designed with at least one oil separator, through which an air-oil volume flow can be guided out of at least one area supplied with oil for separating the oil.

In accordance with the invention, the separation capacity in the area of the oil separator is in particular increased in comparison with solutions known from the state of the art by a simple design in that the air-oil volume flow from the area supplied with oil can be introduced into the oil separator via an interior—in which rotating components such as gears, bearing device and the like can be supplied with lubricating and cooling oil preferably via a lubricating and cooling circuit—of an accessory gearbox casing, and the air can be discharged from the oil separator via an air outlet and the oil via an oil outlet.

By introducing the air-oil volume flow from the area supplied with oil into the interior of the accessory gearbox casing, a temperature of the air-oil volume flow can be reduced in simple manner when there is a suitable temperature difference between the interior of the accessory gearbox casing and the air-oil volume flow. With suitable cooling of the air-oil volume flow, oil present in gaseous form condenses in the air-oil volume flow, which favours an increase in the drop diameters of the oil particles present in the area of the air-oil volume flow. Additionally, the oil droplets present in the air-oil volume flow combine when they meet with oil droplets already present in the interior of the accessory gearbox casing to form larger drops, which is desirable, due to the prevailing forces of attraction, said drops being mechanically separable from the air in the further flow path of the air-oil volume flow with less effort than oil particles of smaller diameter. The possibility then exists of discharging the cleaned air downstream of the oil separator to the environment of the jet engine or to an engine core or bypass flow, while the separated oil is returned via the oil outlet to an oil circuit of the jet engine.

In order to ensure that the introduction of the air-oil volume flow has no disadvantageous effect on the cooling and lubrication of gear pairings arranged in the interior of the accessory gearbox casing, baffles are provided in the area of the gear pairings of the jet engine in accordance with the present invention, by means of which those areas of gear pairings of the accessory gearbox to be supplied with oil for cooling and lubrication can be shielded from the air-oil volume flow.

In an embodiment of the jet engine operable with a high separation capacity in the area of the oil separator, said oil separator is provided with a porous area that can be set to rotate and which is arranged in the flow path of the air-oil volume flow and can be passed by said air-oil volume flow.

The increase as described above of the drop diameters, which is effected by introducing the air-oil volume flow out of the at least one area supplied with oil into the interior of the accessory gearbox casing, also leads to an improvement of the separation capacity in the porous area of the oil separator, in which the oil present in the air-oil volume flow is separated from the latter on the one hand as in the area of an impingement filter and on the other hand as in the area of a centrifuge. The enlarged oil particles of the air-oil volume flow in the area of the interior of the accessory gearbox casing can be more efficiently separated and with low effort in the porous area, which can be designed preferably as a metal foam or the like. As a result, oil losses occurring via the exhaust air of a jet engine are reduced by the lower emissions.

In a simply designed embodiment of the jet engine in accordance with the invention, at least one deflection area is provided in the flow path of the air-oil volume flow upstream of the porous area of the oil separator, in the area of which at least part of the oil can be separated from the air-oil volume flow by the effect of the centrifugal force. As a result, larger oil particles or oil droplets can be separated from the air-oil volume flow even before entry into the porous area of the oil separator in a simple design, and a flow resistance in the porous area of the oil separator due to an excessive load of oil can be limited to a defined level.

The separation capacity can, in a further development of the jet engine in accordance with the invention, be improved in that upstream of the porous area of the oil separator at least one centrifuge is in turn provided in the flow path of the air-oil volume flow, in the area of which at least part of the oil can be separated from the air-oil volume flow by the effect of the centrifugal force. The degree of separation can here be set to the required extent depending on the energy applied in the area of the centrifuge, for example depending on the degree that the air-oil volume flow is loaded with oil.

In a simple to assemble embodiment of the jet engine, the deflection area and/or the centrifuge is provided in the area of the oil separator and preferably integrated into a casing of the oil separator, so that the oil separator represents a module fittable with low effort inside the intended installation space of the jet engine.

The oil loss of a jet engine can be further reduced in a cost-effective and space-saving way when several areas of a jet engine supplied with oil are in operative connection with the oil separator via the interior of the accessory gearbox casing.

In further advantageous embodiments of the jet engine in accordance with the invention, the oil separator and/or the deflection area and/or the centrifuge is/are arranged at least partially inside and/or outside a casing of the accessory gearbox, where an arrangement of the various assemblies inside the accessory gearbox casing represents additional protection of the oil separator, of the deflection area and/or of the centrifuge from environmental effects, while an arrangement of said assemblies outside the accessory gearbox casing in some circumstances does not necessitate design modifications in the area of the accessory gearbox casing.

An area supplied with oil is, in further advantageous embodiments of the jet engine in accordance with the invention, a bearing chamber and/or an oil tank, so that oil transported out of these areas by an airflow is separable from the latter to the extent described above with a high separation capacity and can be returned with low effort into an oil circuit of a jet engine.

Depending on the application in question, it is also possible to design the oil separator of the jet engine in accordance with the invention with means for applying electrostatic forces known from DE 10 2006 058 343 A1 in order to further improve the separation capacity of the oil separator.

Both the features stated in the patent Claims and the features stated in the following exemplary embodiments of the jet engine in accordance with the invention are each suitable, singly or in any combination with one another, to develop the subject matter of the invention. The respective feature combinations do not represent any restriction with regard to the development of the subject matter in accordance with the invention, but have substantially only exemplary character.

Further advantages and advantageous embodiments of the jet engine in accordance with the invention become apparent from the patent Claims and the exemplary embodiments described in principle in the following with reference to the accompanying drawing, where in the description of the various exemplary embodiments the same reference numerals are used for components of identical design and function for greater clarity.

Figure 1B:
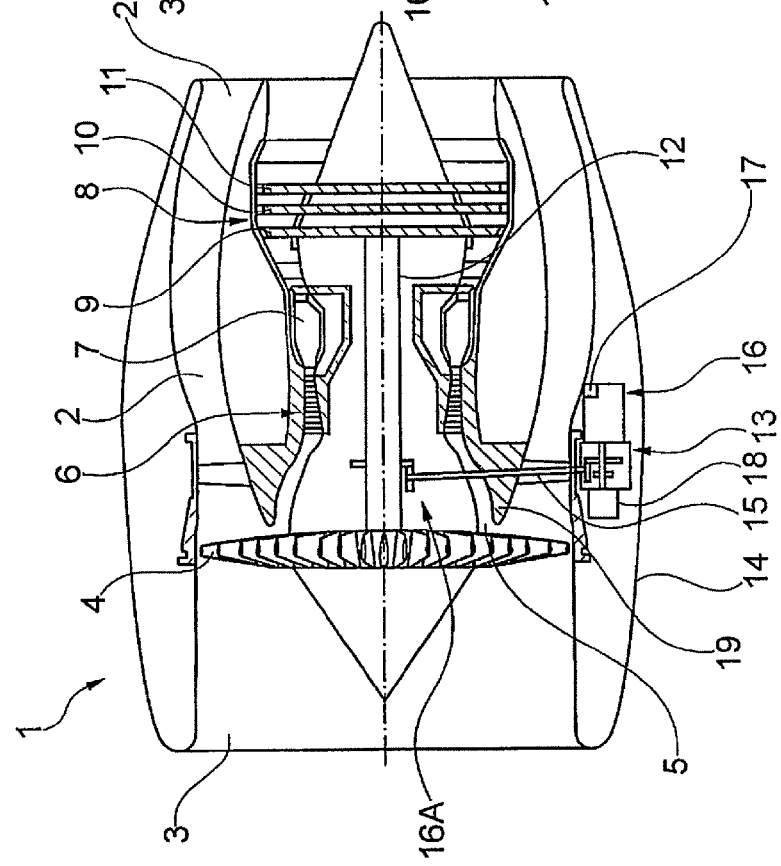
Figure 2:
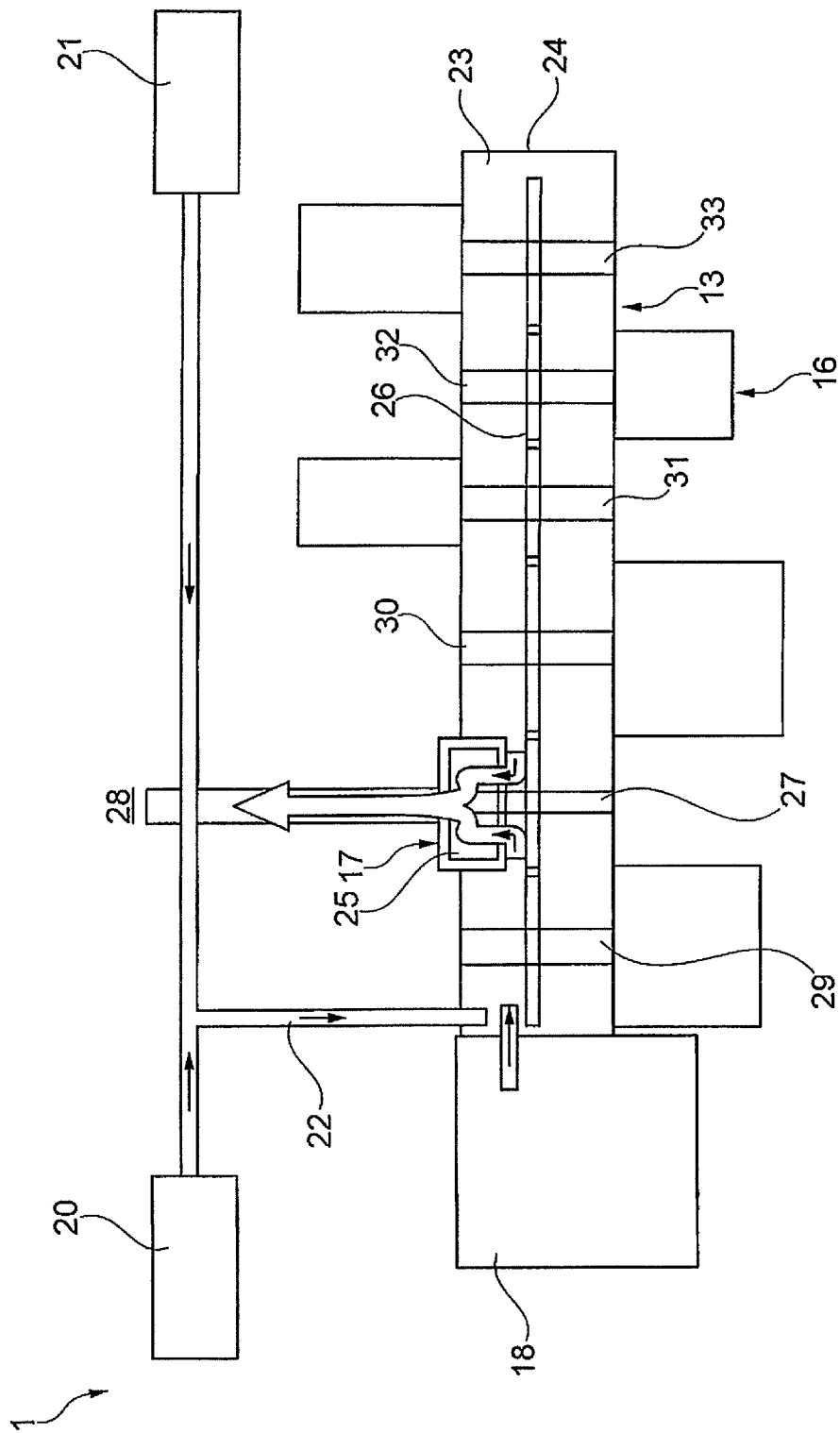

In the drawing,

FIG. 1a shows a highly schematized longitudinal sectional view of a jet engine featuring an accessory gearbox arranged in the fan casing, FIG. 1b shows a representation of a jet engine corresponding to FIG. 1a, having an accessory gearbox mounted in the area of the engine core, and FIG. 2 shows a highly schematized partial representation of the jet engine according to FIG. 1a with an oil separator arranged in the area of the accessory gearbox.

FIGS. 1a and 1b each show a jet engine 1 in a longitudinal sectional view. The jet engine is provided with a bypass duct 2 and an intake area 3, where a fan 4 adjoins downstream the intake area 3 in a manner known per se. Again downstream of the fan 4, the fluid flow in the jet engine 1 splits into a bypass flow and a core flow, with the bypass flow flowing through the bypass duct 2 and the core flow into an engine core 5 which is in turn designed in a manner known per se with a compressor device 6, a burner 7 and a turbine device 8.

The turbine device 8 has in the present invention three rotor devices 9, 10 and 11, which have a substantially comparable design and are connected to an engine axis 12.

In the design of the jet engine 1 according to FIG. 1a, an accessory gearbox 13 is arranged in an outer engine casing 14, delimiting the bypass duct 2 and representing the outer circumferential area of the jet engine 1. The accessory gearbox 13 in the present invention is connected via a drive shaft 15 running in the radial direction of the jet engine 1 and via an inner gearbox 16A to the engine axis 12 and is thus driven/subjected to torque by the engine axis 12 during operation of the jet engine 1. Various auxiliary units 16 and an oil separator 17, which is also referred to as breather, are subjected to torque to the required extent by the accessory gearbox 13. Additionally, an oil tank 18 is provided in the area of the accessory gearbox 13, which represents a hydraulic fluid reservoir, from which oil is tapped for cooling and lubricating various areas of the jet engine 1 such as bearing devices, gear pairings of the inner gearbox 16A and of the accessory gearbox 13, and further assemblies of the jet engine 1 that are to be cooled and lubricated.

In contrast to this, the accessory gearbox 13 with the auxiliary units 16 and the oil separator 17 is arranged, in the design of the jet engine 1 according to FIG. 1b, in the radial direction between the bypass duct 2 and the engine core 5 in a component 19 delimiting both the bypass duct 2 and the engine core 5.

FIG. 2 shows the jet engine 1 according to FIG. 1a in a highly schematized form in the area of the accessory gearbox 13, the auxiliary units 16 and the oil separator 17, the latter being in the present invention in operative connection to the oil tank 18 and two further areas 20, 21 designed as bearing chambers of the jet engine and supplied during operation of the jet engine 1 with oil from the oil tank 18 for lubrication and cooling. The area 20 here represents the bearing chamber of the front bearing and the area 21 the bearing chamber of the rear bearing of the jet engine 1.

The aspects of the design of the jet engine 1 according to FIG. 1a explained in more detail below are substantially also implementable in the embodiment of the jet engine 1 according to FIG. 1b, for which reason reference is made to the description for FIG. 2 with regard to the mode of operation of the jet engine 1 according to FIG. 1b, in particular in the area of the accessory gearbox 13, the auxiliary units 16 and the oil separator 17.

In the embodiment of the jet engine 1 shown in FIG. 2, air-oil volume flows from the front bearing chamber 20 and from the rear bearing chamber 21 can each be guided in the direction of a line section 22, which in the present invention issues into an interior 23 of a casing 24 of the accessory gearbox 13. Furthermore, the oil tank 18 too in the present invention is connected to the interior 23 of the casing 24 of the accessory gearbox 13, to allow introduction of an air-oil volume flow of the oil tank 18 and of the air-oil volume flows of the bearing chambers 20 and 21 into the interior 23 via the line section 22. The interior 23 of the casing 24 of the accessory gearbox 13 is linked to the oil separator 17, where an air-oil volume flow from the casing 24 of the accessory gearbox 13 is introduced into the oil separator 17 when appropriate pressure is applied to the interior 23. A porous area 25 is rotatably arranged in an interior of the oil separator 17 and can be passed by the air-oil volume flow flowing out of the interior 23 of the casing 24 of the accessory gearbox 13.

The porous area 25 can in the present invention be driven by the accessory gearbox 13 via a gear 27 and acts as a centrifuge in order to reduce as far as possible the proportion of oil in the air-oil volume flow flowing through the porous area 25. The proportion of oil of the air-oil volume flow in the oil separator 17 is here reduced in the zone of the porous area 25 by separation of the oil from the air, on the one hand as during flowing through an impingement filter and on the other hand as in the area of a centrifuge, due to the rotation of the porous area 25. The oil filtered out of the air-oil volume flow in the zone of the porous area 25 is extracted in the outer area of the oil separator 17 in FIG. 2, in a manner not shown in detail, via a pump device and returned to the oil tank 18. The air flowing out of the oil separator 17 in the direction of the environment 28 has only a low oil load. The gear 27 is, in addition to further gears 29 to 33, non-rotatably connected to a gear shaft 26 and arranged in the interior 24 of the accessory gearbox 13.

As a result of the air-oil volume flows of the bearing chambers 20 and 21 and of the oil tank 18 being introduced into the interior 23 of the casing 24 of the accessory gearbox 13, the oil load of the air volume flow flowing off in the direction of the environment 28 is kept low in a simple manner. This results from the fact that the air-oil volume flows of the bearing chambers 20 and 21 and of the oil tank 18 passing through the interior 23 are initially cooled to the oil temperature in the accessory gearbox 13 due to the heavily oil-containing environment inside the accessory gearbox 13. The condensation of oil present in gaseous form in said air-oil volume flows that takes place due to the cooling of said air-oil volume flows leads to an increase in the diameter of the oil particles present in the air-oil volume flows, said particles being in any event larger than the oil drops which cannot be filtered out in the porous area 25 due to their small size.

Upstream of the oil separator 17, in the present invention in the area of the transition between the oil separator 17 and the interior 23 of the casing 24 of the accessory gearbox 13, a deflection area is provided for the air-oil volume flow guided out of the interior 23 in the direction of the oil separator 17, in the area of which at least part of the oil is separated from the air-oil volume flow due to the centrifugal force acting in the deflection area. Hence the oil load of the air-oil volume flow is already reduced in the deflection area by the separation of larger droplets having a greater inertia than oil particles with smaller diameters.

Alternatively to this, there is also the possibility of providing several deflection areas for the individual air-oil volume flows out of the bearing chambers 20 and 21 and out of the oil tank 18, in order to allow separation of oil from the air-oil volume flows even before the entry into the interior 23 of the casing 24 of the accessory gearbox 13.

Regardless of the arrangement of the deflection area, the smaller droplets present in the air-oil volume flows out of the bearing chambers 20 and 21 and out of the oil tank 18 are enlarged by their introduction into the interior 23, which is favoured by the forces of attraction prevailing in each case between the individual oil droplets in the air-oil volume flows and the oil droplets present in the air in the interior 23. If the collected air-oil volume flow enriched with oil flows through the oil separator 17 and its porous area 25, which rotates accordingly during operation of the jet engine 1, a substantial proportion of the oil present in the air-oil volume flow is hurled outwards and then extracted from the oil separator 17 in the direction of the oil tank 18. The oil particles now enlarged in the collected air-oil volume flow by washing out the oil in the area of the interior 24 of the accessory gearbox 13 can be separated from the metal foam 25 in the breather 17 substantially more efficiently, so that oil losses of the jet engine 1 in the direction of the environment 28 are minimized by the reduced emissions.

With the design according to FIG. 2, the oil separator 17 is almost completely integrated into the casing 24 of the accessory gearbox 13. Depending on the application in question, it is also possible to arrange the oil separator 17 completely inside or completely outside the casing 24 of the accessory gearbox 13.

LIST OF REFERENCE NUMERALS

1 Jet engine
2 Bypass duct
3 Intake area
4 Fan
5 Engine core
6 Compressor device
7 Burner
8 Turbine device
9, 10, 11 Rotor device
12 Engine axis
13 Accessory gearbox
14 Engine casing
15 Drive shaft
16 Auxiliary units
16A Inner gearbox
17 Oil separator
18 Oil tank
19 Component
20 Area, front bearing chamber
21 Area, rear bearing chamber
22 Line section
23 Interior
24 Casing
25 Porous area 26 Gear shaft
27 Gear
28 Environment
29 to 33 Gear

What is claimed is:

1. A jet engine oil separation system, comprising:
   an accessory gearbox including a casing and at least one gear pairing positioned in an interior of the casing,
   an oil separator for separation of oil and air from an air-oil volume flow,
   at least one line guiding the air-oil volume flow to the interior of the casing from at least one separate engine area supplied with oil,
   at least one deflector provided in an area of the at least one gear pairing to shield the at least one gear pairing from the air-oil volume flow from the first line,
   wherein the oil separator is positioned in a flow path of the air-oil volume flow downstream of the deflector to receive the air-oil volume flow from the interior of the casing,
   an air outlet for discharging separated air from the oil separator,
   an oil outlet for discharging separated oil from the oil separator.

2. The jet engine oil separation system in accordance with claim 1, wherein the oil separator includes a rotatable porous area arranged in the flow path of the air-oil volume flow.

3. The jet engine oil separation system in accordance with claim 2, and further comprising at least one deflection area provided in the flow path of the air-oil volume flow upstream of the porous area of the oil separator whereby at least part of the oil can be separated from the air-oil volume flow by centrifugal force.

4. The jet engine oil separation system in accordance with claim 2, and further comprising at least once centrifuge positioned upstream of the porous area of the oil separator in the flow path of the air-oil volume flow, whereby at least part of the oil can be separated from the air-oil volume flow by centrifugal force.

5. The jet engine in accordance with claim 4, wherein the at least one centrifuge is provided in an area of the oil separator.

6. The jet engine oil separation system in accordance with claim 1, wherein the at least one separate engine area supplied with oil includes a plurality of separate engine areas supplied with oil and the at least one line includes a plurality of lines guiding the air-oil volume flow to the interior of the casing from the plurality of separate engine areas supplied with oil to be in operative connection with the oil separator via the interior of the casing.

7. The jet engine oil separation system in accordance with claim 4, wherein at least one chosen from the oil separator, the deflector and the centrifuge is arranged at least partially inside the casing.

8. The jet engine oil separation system in accordance with claim 1, wherein the separate area supplied with oil is at least one chosen from an oil tank and a bearing chamber.

9. The jet engine oil separation system in accordance with claim 3, wherein the at least one deflection area is provided in an area of the oil separator.

10. The jet engine oil separation system in accordance with claim 4, wherein at least one chosen from the oil separator, the deflector and the centrifuge is arranged at least partially outside the casing.

* * * * *